United States Patent [19]

Narita et al.

[11] Patent Number: 5,205,615
[45] Date of Patent: Apr. 27, 1993

[54] WHEEL COVER MOUNTING DEVICE

[75] Inventors: Yasuhide Narita; Takashi Ichikawa; Tokuo Hayakawa, all of Aichi, Japan

[73] Assignee: Kabushiki Kaisha Tokai Rika Denki Seisakusho, Aichi, Japan

[21] Appl. No.: 705,343

[22] Filed: May 24, 1991

[30] Foreign Application Priority Data

May 30, 1990 [JP] Japan .................................. 2-140626

[51] Int. Cl.⁵ .............................................. B60B 7/06
[52] U.S. Cl. ................................. 301/37.35; 301/37.34
[58] Field of Search ............ 301/37 R, 37 PB, 37 TP, 301/37 C, 37 CD, 108 R; 70/360

[56] References Cited

U.S. PATENT DOCUMENTS

| | | | |
|---|---|---|---|
| 2,148,160 | 2/1939 | Hollerith | 301/37 CD |
| 2,595,873 | 5/1952 | Mulhern | 301/37 CD |
| 2,614,001 | 10/1952 | Rycroft | 301/37 R X |
| 3,910,082 | 10/1975 | Patriquin | 70/360 |
| 4,054,323 | 10/1977 | Lewis | 301/37 R X |
| 4,194,377 | 3/1980 | Maeda | 70/360 |
| 4,210,367 | 7/1980 | Spisak | 301/37 R |
| 4,809,525 | 3/1989 | Cox | 70/360 X |

FOREIGN PATENT DOCUMENTS 966881 4/1975 Canada ........................ 301/37 TP

*Primary Examiner*—Russell D. Stormer

[57] ABSTRACT

A device for mounting a wheel cover on a disc wheel for use in an automobile. The device includes a plurality of engagement units. Each engagement unit includes a leg extending from the wheel cover, and a housing secured on the disc wheel. The leg has at its tip portion an engagement pin. The housing includes a wall having a C-shaped cutout forming a hook portion. There are provided in the housing a spring and slide plate supported by the spring. When the wheel cover is depressed toward the disc wheel and rotated in a predetermined direction, each leg is received in the housing and guided by the slide plate so that the pin is introduced into the hook portion through the cutout. The engagement of the pin with the hook portion is ensured by the urging of the spring member.

8 Claims, 3 Drawing Sheets

WHEEL COVER MOUNTING DEVICE

BACKGROUND OF THE INVENTION

1. Field of the Invention

The present invention relates to a wheel cover mounting device for mounting the wheel cover on a disc wheel of an automobile.

2. Description of the Related Art

Conventionally, the wheel cover generally includes a plurality of spring claws attached on the periphery of the inner surface thereof. The claws are engaged with an inner recess of a hump formed in the disc wheel so that the wheel cover is mounted thereon. That is, the conventional method for mounting the wheel cover on the disc wheel utilizes the recess of the hump as a counter engagement means to the spring claws. The conventional method or arrangement for mounting the wheel cover on the disc wheel involves the following problems.

Namely, first of all, since the different disc wheels have, respectively the different dimensions of humps even though the diameter of the disc wheels are the same, the same wheel cover is not adaptable to the different disc wheels. Secondly, since the engagement of the claws and the hump utilizes the spring force of the claws, a strong mounting force is required therefore. Particularly, in the case where the intended wheel cover is not completely fitted in the disc wheel, the mounting force becomes greatly large. Further, since the wheel cover receives the spring force of the claws, the corresponding portions of the wheel cover must be reinforced, i.e. it must be made thick, resulting in the increase of the weight of the wheel cover.

SUMMARY OF THE INVENTION

Accordingly, an essential object of the present invention is to provide a wheel cover mounting device which includes a pair of engagement means engageable with each other, one being secured on the wheel cover, while the other being secured on the disc wheel, in which the conventional method of utilizing the hump of the disc wheel as one of the engagement means is excluded and the conventional problems are solved.

In accomplishing this and other objects, according to the present invention, there is provided an improvement of the wheel cover mounting device for in use an automobile.

The device has a plurality of first engagement means which are, respectively, to be arranged circumferentially on a wheel cover so as to extend inwardly from an inner surface thereof.

The device also has a plurality of second engagement means, corresponding to the first engagement means, which are, respectively, to be arranged circumferentially on a disc wheel, to which the wheel cover is to be attached, so as to extend outwardly from an outer surface thereof.

One of the first and second engagement means includes a pin member, while the other includes a hook member with which the pin member becomes engaged when the wheel cover is depressed and subsequently rotated in a predetermined direction with respect to the disc wheel.

One of the first and second engagement means has a spring means for urging the pin member to ensure an engagement of the pin member with the hook member.

With the above-described arrangement of the wheel cover mounting device, the first engagement means may be engaged with the hook member of the second engagement means by depressing and rotating the wheel cover with respect to the disc wheel. In the state in which the pin member is engaged with the hook member, the engagement of the first engagement means, accordingly the pin member to the hook member is ensured by urging of the spring member, resulting in the wheel cover being prevented from being easily removed from the disc wheel.

In addition, since the second engagement means is employed on the disc wheel as a special member so as to engage the first engagement means on the wheel cover, the adaptability of the wheel cover is not affected by the dimensions of the disc wheel. Namely, it is not affected by the configuration and position of the hump of the disc wheel. Accordingly, the adaptability of the wheel cover with respect to the same dimensions of disc wheels is ensured as far as the second engagement means are arranged in the predetermined positions.

Still further, since the construction is such that the pin member of the first engagement means and the hook member of the second engagement means are engaged with each other, their engagement does not require a large spring force for supporting the entire wheel cover, so that the force for mounting the wheel cover onto the disc wheel is not so large. Therefore, the wheel cover does not need so large rigidity, so that a thin wheel cover may be provided according to the present invention.

According to one preferred embodiment of the present invention, each first engagement means comprises a leg member extending from the inner surface of the wheel cover and the pin member provided on a tip portion of the leg member. Each second engagement means comprises a housing member secured on the disc wheel. The housing member has a surrounding wall which forms therein a chamber for receiving the tip portion of the leg member. The surrounding wall of the housing member has a cutout which forms a hook portion of the hook member to receive and guide the pin member so as to engage the hook portion. The housing member has therein the spring member and a slide plate which is supported on the spring member, whereby the tip portion of the leg member is guided to the hook portion as sliding on the slide plate.

The leg member is preferably formed integrally with the wheel cover.

With the above-described arrangement according to the preferred embodiment, when each leg member is inserted into the housing member, the slide plate member may be resiliently moved toward and away from the bottom of the housing aided by the spring member. When the wheel cover is depressed and rotated in a predetermined direction with respect to the disc wheel, each pin member is introduced into the hook portion of the housing through the cutout as sliding on the slide plate member and becomes engaged with the hook portion. The pin member is ensured to engage the hook portion by the urging of the spring member.

Alternatively, the second engagement means may comprise a metal framework member and the housing, the framework member including a side wall having a hook portion, a U-shaped plate spring for urging the leg member inserted in the cutout to ensure the engagement of the leg member with the hook member, and an anchor member to be secured on the disc wheel. This arrangement results in reducing the number of the components thereof and in making the structure of the device stronger.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

This and other objects and features for the present invention will become apparent from the following description taken in conjunction with the preferred embodiment thereof with reference to the accompanying drawings which are given by way of illustration only, and thus are not limitative of the present invention, and in which.

DETAILED DESCRIPTION OF THE INVENTION

Figure 1:
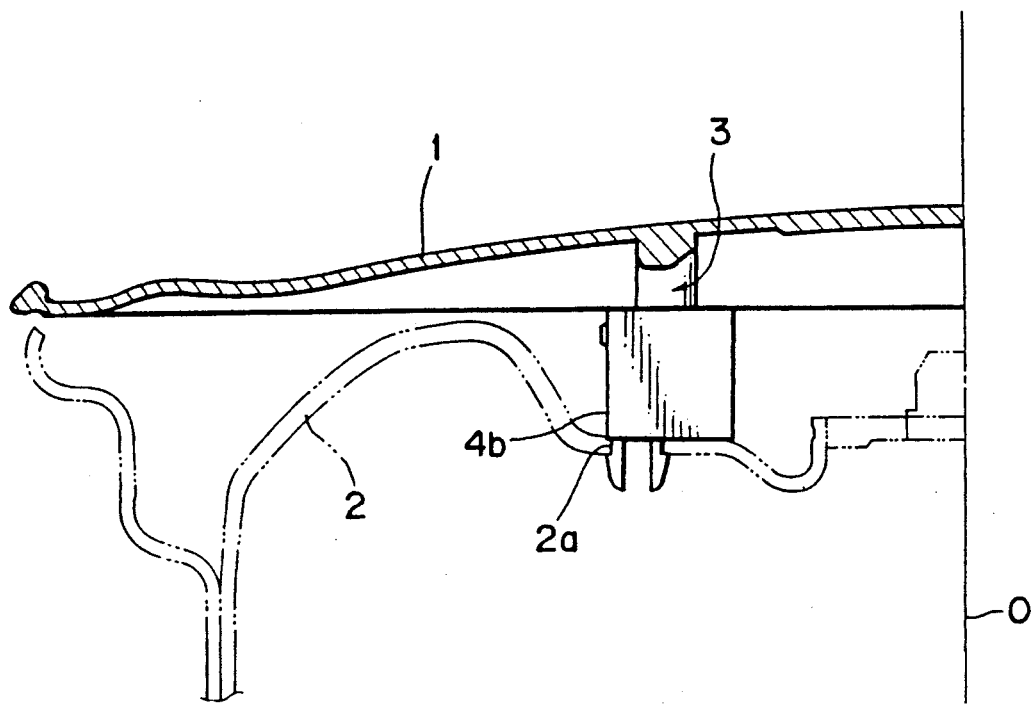
FIG. 1 is a sectional view showing a condition in which a wheel cover is mounted on a disc wheel by means of a wheel cover mounting device according to a preferred embodiment of the present invention.

Before the description of the present invention proceeds, it is to be noted that like parts are designated by like reference numerals throughout the accompanying drawings.

Referring first to FIG. 1, a wheel cover 1 is mounted on a disc wheel 2 of an automobile by means of a wheel cover mounting device according to one preferred embodiment of the present invention. The device includes a first engagement means 3 which is formed integrally with the wheel cover 1, and a second engagement means 4 which is secured on a predetermined position of the disc wheel 2. There are provided a plurality of, for example four, wheel mounting devices having the above-described construction which are arranged circumferentially between the wheel cover 1 and the disc wheel 2 around a central axis O thereof.

The first engagement means 3 includes a leg 3a formed integrally with the wheel cover 1, from the lower end of which a pin 3b laterally extends.

The second engagement means 4 comprises a housing 4a which includes a bottom wall and four side walls. A pair of anchor plates 4e extend from the bottom wall of the housing 4a so as to engage a mounting hole 2a formed in the predetermined portion of the disc wheel 2.

The housing 4a has a chamber 4i formed by the side walls for receiving the lower end of the leg 3a of the first engagement means 3. One side wall 4b, positioned on the outside with respect to the central axis O, has a C-shaped cutout 4c for forming a hook portion 4d therein. The pin 3b can be introduced into the interior of the hook portion 4d through the cutout 4c. In addition, the cutout 4c includes a slanting face 4h for facilitating the introduction of the pin 3b into the hook portion 4d.

In the housing 4a, a helical spring 4g and a slide plate 4f are disposed. The side plate 4f is upwardly urged by the spring 4g.

Figure 4A:
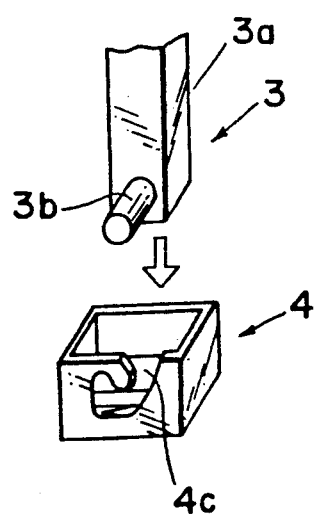
FIGS. 4A and 4B are, respectively, perspectives views showing a process of an engagement of the first and second engagement means.
Figure 4B:
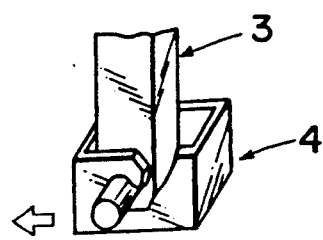
Figure 2:
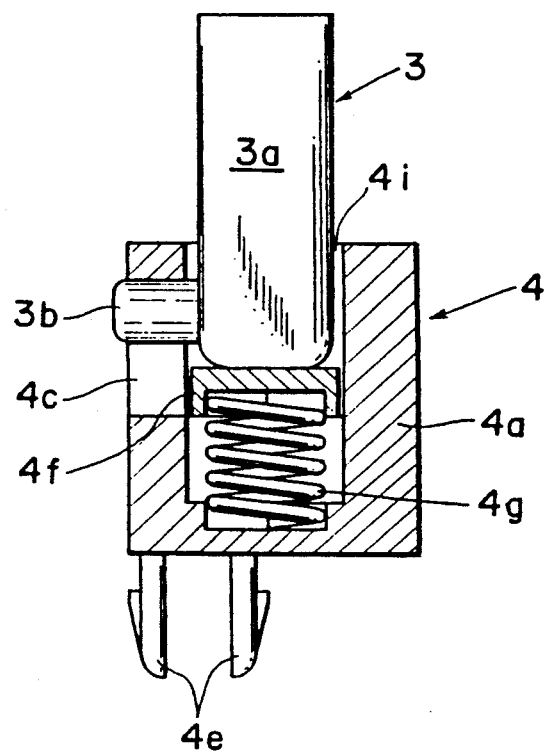
FIGS. 2 and 3 are, respectively, a sectional view and side elevation showing a condition in which first and second engagement means included in the wheel cover mounting device are engaged with each other.
Figure 3:
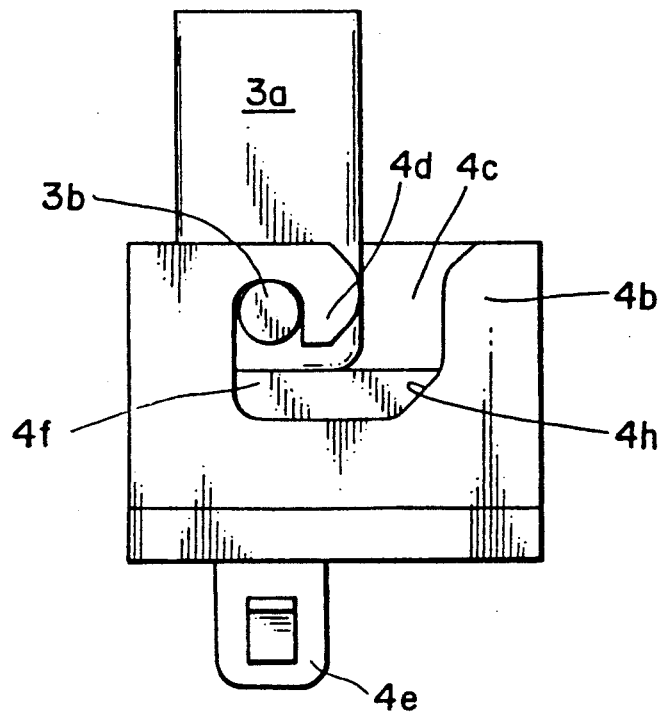

With the above-described construction according to the first embodiment, when the wheel cover 1 is required to be mounted on the disc wheel 2, as shown in FIG. 4A the wheel cover 1 is brought close to the disc wheel 2 so that the leg 3a of each first engagement means 3 is introduced into the chamber 4i of the housing 4a. At this time, the pin 3b is guided by the cutout 4c. Then, the leg 3a depresses the slide plate 4f against the urge of the spring 4g and slides on the plate 4f to move to the hook portion 4d, as shown in FIG. 4B. When the pin 3b has been introduced into the interior of the hook portion 4d, the slide plate 4f returns to the initial upward position by aid of the spring 4g so that the pin 3b is reliably maintained engaging the hook portion 4d of the housing 4a.

The above-described operation for mounting the wheel cover 1 on the disc wheel 2 is easily performed by rotating the wheel cover 1 with respect to the disc wheel 2 with the former depressed onto the latter and subsequently releasing the depressing force.

Figure 5:
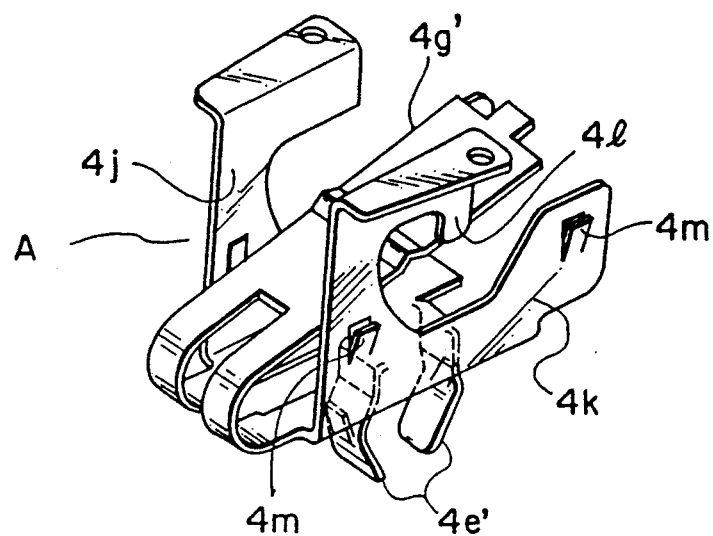
FIG. 5 is a perspective view showing a framework according to a second embodiment of the present invention.
Figure 6:
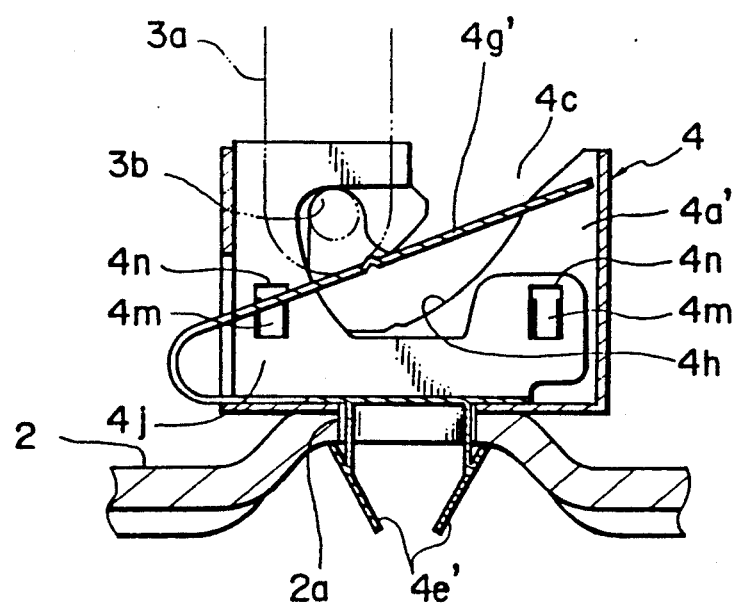
FIG. 6 is a sectional view showing a condition in which the framework is disposed in a housing and secured on the disc wheel.

A second embodiment of the present invention is shown in FIGS. 5 and 6. In this second embodiment, the second engagement means 4 comprises a framework member A made of metal and a housing 4a' for accommodating the framework member A, made of plastic material. The housing 4a' is substantially the same as the housing 4a of the first embodiment. However, the slanting face 4h according to the second embodiment extends from the upper portion of the cutout 4c to the lower portion thereof adjacent to the hook portion. The framework member A has the same functions as those of the slide plate 4f, spring 4g and anchor plates 4e according to the first embodiment. According to this second embodiment, the wheel cover mounting device is reinforced by the metal framework A.

The framework A comprises a pair side walls 4j and 4k, U-shaped plate spring 4g' and anchor plates 4e'. As shown best in FIG. 6, the framework A is accommodated in the housing 4a' and its anchor plates 4e' are inserted in the hole 2a of the disc wheel 2 to be secured on the disc wheel 2. Each side wall 4j and 4k has a cut and raised projection 4m which is engaged with a window 4n formed in the corresponding side walls of the housing 4a' so that the framework A is fixed in the housing 4.

With the above-described arrangement of the second embodiment, the leg 3a of the first engagement means 3 is introduced into the C-shaped cutout 4c so as to resiliently depress the upper portion of the spring 4g' and to slide thereon to the left in FIG. 6 as being guided by the slanting face 4h, resulting in the pin 3b becoming engaged with the hook portion of the housing 4a, and a hook portion 4l formed in the side wall 4k of the framework 4. It is noted that when the leg 3a is inserted into the housing 4a', the pin 3b is automatically guided toward a position adjacent to the hook portion by the slanting face 4h without an intentional rotation operation of the wheel cover.

The second embodiment is advantageous such that the number of the components of the device can be reduced and its structure becomes stronger.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A wheel cover mounting device in use for an automobile comprising:

a plurality of first engagement means which are, respectively, to be arranged circumferentially on a wheel cover so as to extend inwardly from an inner surface thereof, and a plurality of second engagement means, corresponding to the first engagement means, which are, respectively, to be arranged circumferentially on a disc wheel, to which the wheel cover is to be attached, so as to extend outwardly from an outer surface thereof, one of the first and second engagement means including a pin member, while the other including a hook member with which the pin member becomes engaged when the wheel cover is depressed and subsequently rotated in a predetermined direction with respect to the disc wheel, said other engagement means having a spring means for urging the pin member to ensure an engagement of the pin member with the hook member, said each first engagement means comprises a leg member extending from the inner surface of the wheel cover and the pin member provided on a tip portion of the leg member, said each second engagement means comprises a housing member secured on the disc wheel, the housing member having a surrounding wall which forms therein a chamber for receiving the tip portion of the leg member, the surrounding wall of the housing member having a cutout which forms a hook portion of the hook member to receive and guide the pin member so as to engage the hook portion, the housing member having therein the spring member and a slide plate member which is supported on the spring member, whereby the tip portion of the leg member is guided to the hook portion by sliding on the slide plate member.

2. The wheel cover mounting device according to claim 1, wherein the leg member is formed integrally with the wheel cover.

3. A wheel cover mounting device in use for an automobile comprising:

a plurality of first engagement means which are, respectively, to be arranged circumferentially on a wheel cover so as to extend inwardly from an inner surface thereof, and a plurality of second engagement means, corresponding to the first engagement means, which are, respectively, to be arranged circumferentially on a disc wheel, to which the wheel cover is to be attached, so as to extend outwardly from an outer surface thereof, one of the first and second engagement means including a pin member, while the other including a hook member with which the pin member becomes engaged when the wheel cover is depressed and subsequently rotated in a predetermined direction with respect to the disc wheel, said other engagement means having a spring means for urging the pin member to ensure an engagement of the pin member with the hook member, said each first engagement means comprises a leg member extending from the inner surface of the wheel cover and the pin member provided on a tip portion of the leg member, said each second engagement means comprises a housing member having a surrounding wall which forms therein a chamber for receiving the tip portion of the leg member, the surrounding wall of the housing member having a cutout which forms a hook portion of the hook member to receive and guide the pin member so as to engage the hook portion, and a metal framework member accommodated in the housing member and including a side wall having a hook portion of the hook member, a U-shaped plate spring for urging the leg member inserted in the cutout to ensure the engagement of the leg member with the hook member, and an anchor member to be secured on the disc wheel.

4. A wheel cover mounting device in use for an automobile comprising:

a plurality of first engagement means arranged respectively circumferentially on a wheel cover to extend inwardly from an inner surface thereof; and a plurality of second engagement means corresponding to the first engagement means and arranged respectively circumferentially on a disc wheel, the wheel cover being attachable to the disc wheel and the plurality of second engagement means extend outwardly from an outer surface of the disc wheel;

one of the first and second engagement means including a pin member while the other includes a housing member secured on the disc wheel, the housing member having a surrounding wall which defines a chamber for receiving said one of the first and second engagement means, the surrounding wall of the housing member having a cutout which forms a hook portion to receive and guide the pin member to engage the hook portion, the cutout including a slanting face for facilitating introduction of the pin member into the hook portion, the pin member becomes engaged with the hook portion when the wheel cover is depressed and subsequently rotated in a predetermined direction with respect to the disc wheel;

said other engagement means having a spring means for urging the pin member in a direction opposite to a wheel cover depressing direction to ensure engagement of the pin member with the hook portion.

5. The wheel cover mounting device according to claim 4, wherein the first engagement means comprises a leg member with the pin member being mounted thereon and wherein the second engagement means comprises the housing member.

6. The wheel cover mounting device according to claim 5, further comprising a spring and slide plate in the housing member, the leg member engages and depresses the slide plate when the wheel cover is being mounted on the disc wheel, the pin member extending through the cutout and being engaged by the hook portion when the wheel cover is mounted on the disc wheel, the spring urges the slide plate against the leg member to hold the pin member against the hook portion when the wheel cover is mounted on the disc wheel.

7. The wheel cover mounting device according to claim 5, wherein the leg member is formed integrally with the wheel cover.

8. The wheel cover mounting device according to claim 5, wherein the housing member accommodates a metal framework member and a U-shaped plate spring for urging the pin member on the leg member into engagement with the hook member, the device further comprising an anchor member for securing the housing member to the disc wheel.

* * * * *